(12) United States Patent
Schenk (10) Patent No.: US 7,376,689 B2
(45) Date of Patent: May 20, 2008

(54) METHOD AND APPARATUS FOR REDUCING THE CREST FACTOR OF A SIGNAL

(75) Inventor: Heinrich Schenk, Munich (DE)

(73) Assignee: Infineon Technologies AG, Munich (DE)

( * ) Notice: Subject to any disclaimer, the term of this patent is extended or adjusted under 35 U.S.C. 154(b) by 747 days.

(21) Appl. No.: 10/799,353

(22) Filed: Mar. 12, 2004

(65) Prior Publication Data

US 2005/0203977 A1   Sep. 15, 2005

(51) Int. Cl.
  *G06F 17/10* (2006.01)
(52) U.S. Cl. ..................................... 708/300
(58) Field of Classification Search ................. 708/300
  See application file for complete search history.

(56) References Cited

U.S. PATENT DOCUMENTS

| | | | |
|---|---|---|---|
| 6,038,261 A | 3/2000 | Mestdagh | |
| 6,125,103 A * | 9/2000 | Bauml et al. | 370/203 |
| 6,424,681 B1 | 7/2002 | Tellado et al. | |
| 6,529,925 B1 | 3/2003 | Schenk | |
| 2002/0105947 A1 | 8/2002 | Kitagawa et al. | |
| 2002/0159550 A1 | 10/2002 | Jin | |
| 2004/0052314 A1* | 3/2004 | Copeland | 375/296 |
| 2004/0186867 A1* | 9/2004 | Schenk | 708/300 |
| 2005/0008094 A1* | 1/2005 | Kramer et al. | 375/296 |
| 2006/0115028 A1* | 6/2006 | Schenk | 375/346 |

FOREIGN PATENT DOCUMENTS

| | | |
|---|---|---|
| DE | 19850642 A1 | 5/2000 |
| JP | 09-018444 | 1/1997 |
| JP | 2001-339361 | 12/2001 |
| JP | 2002-314503 | 10/2002 |

* cited by examiner

*Primary Examiner*—D. H. Malzahn
(74) *Attorney, Agent, or Firm*—Dicke, Billig & Czaja, PLLC

(57) ABSTRACT

A method and apparatus for reducing the crest factor of a signal uses a plurality of partial correction signals having respective predetermined frequencies. For each of the partial correction signals, the following steps are performed: (a) determining a time position of a maximum absolute amplitude of the signal; (b) calculating an amplitude and a phase depending on said maximum absolute amplitude and said time position for the respective partial correction signal; and (c) subtracting the respective partial correction signal from said signal to obtain a partially corrected signal which is used as the signal in step (a) for the next of the plurality of partial correction signals, and going to step (a) for calculating the next partial correction signal. The last-obtained partially corrected signal is output as the reduced-crest factor signal.

34 Claims, 5 Drawing Sheets

METHOD AND APPARATUS FOR REDUCING THE CREST FACTOR OF A SIGNAL

BACKGROUND

The present invention relates to a method and to an apparatus for reducing the crest factor (the ratio of peak to average value) of a signal, for example, a multi-carrier communication signal.

Figure 1:
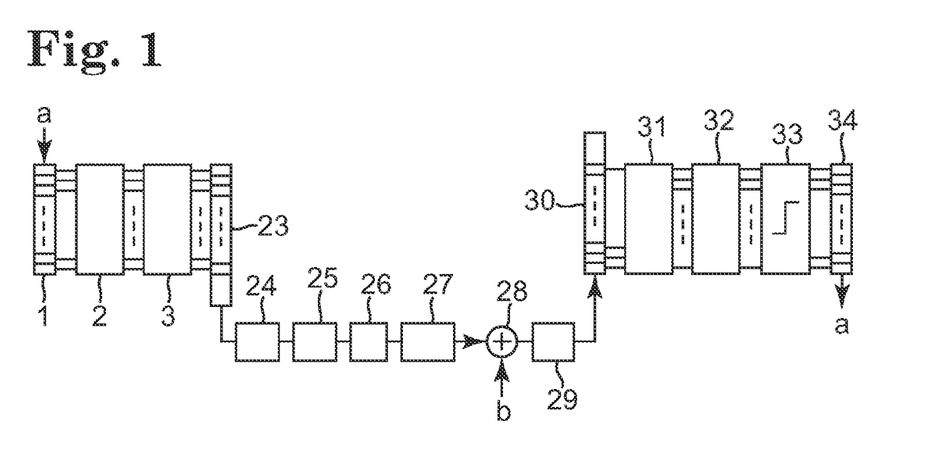
FIG. 1 illustrates a standard multi-carrier transmission system.

In recent years multi-carrier communication systems have been widely used in particular for XDSL communication systems (Digital Subscriber Line) like ADSL (Asymmetric Digital Subscriber Line) or VDSL (Very High Speed Digital Subscriber Line). FIG. 1 illustrates a schematic block diagram of such a transmission system. A serial data signal a is fed to a serial/parallel converter 1 that converts the serial digital data signal a into data packets with N/2 sub-packets, N being an even number. One data packet is transmitted in parallel to an encoder 2, which assigns each sub packet to a separate carrier frequency and supplies a first digital signal vector to an inverse Fourier transformer 3, which performs an inverse Fourier transformation on this vector and generates a second digital signal vector comprising N samples of a signal to be sent. This second digital signal vector is transmitted to a parallel/serial converter 23, which supplies the elements or samples of the second digital signal vector to a digital filter 24 followed by a digital-to-analog converter 25 and a line driver 26. The generated analog transmit signal is transmitted via a channel 27, whereby noise b is added, symbolized by an adder 28. On the receiver side, the signal is equalized by an equalizer/an analog-to-digital converter 29. Then the signal is decoded by performing the reverse operations of the encoding elements 1 to 23, namely through a serial/parallel converter 30, a Fourier transformer 31, a decoder 32, a slicer 33 and a parallel/serial converter 34.

Such a communication system is for example disclosed in U.S. Pat. No. 6,529,925 B1, the content of which is incorporated by reference herein.

Figure 2:
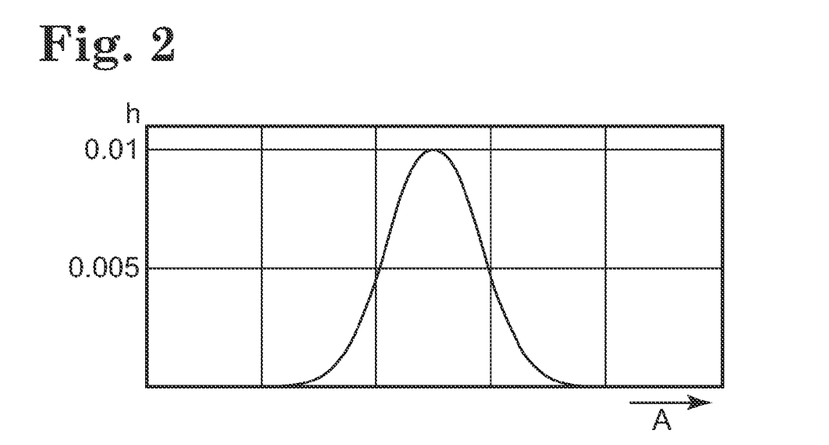
FIG. 2 illustrates an amplitude probability distribution for a standard multi-carrier transmission system.

Since the transmit signal is composed of a plurality of different signals having different carrier frequencies and amplitudes and phases being determined by the data signal and thus having no predetermined relationships, the amplitude of the transmit signal has approximately a Gaussian distribution. FIG. 2 illustrates the probability h of the amplitude A of the transmit signal as determined by a simulation for a discrete multitone modulated transmit signal with a Fourier transform block length of 256.

Because of this Gaussian distribution, the crest factor of the signal is rather large, that is, the transmit signal has a rather high maximum amplitude value compared to the effective or average amplitude value. Since both the digital-to-analog and analog-to-digital converters, as well as the line drivers, have to be adapted to handle the whole possible amplitude range, these elements have to be defined accordingly causing additional costs and chip space. It is therefore desirable to reduce the crest factor, that is to reduce the maximum amplitude.

In principle, two different approaches are known to reduce the crest factor.

A first method for reducing the maximum amplitudes disturbs the transmit signal. These methods comprise clipping methods as described for example in U.S. Pat. No. 6,038,261.

A second method for reducing the maximum amplitude without disturbing the signal.

In general, these methods use one or more of the carrier frequencies to modify the transmit signal in order to reduce the maximum amplitude. The carrier frequencies used for this purpose may or may not only partially be used for the actual data transmission.

One of these methods is described in the already cited U.S. Pat. No. 6,529,925 B1. There, the Nyquist frequency is used as a single carrier frequency for correction purposes, that is, the last frequency in the inverse Fourier transform. In an ADSL signal, this frequency is not used for data transmission so that the correction does not influence the transmission capacity. However, the performance of this method is limited since only a single carrier frequency is used for correction. Furthermore, this method is not applicable to VDSL signals since the Nyquist frequency is outside the usable frequency range both for downstream and for upstream transmission.

In U.S. Pat. No. 6,424,681 B1 a method for reducing the crest factor using a plurality of carrier frequencies is disclosed. These carrier frequencies are preferably evenly distributed over the whole usable frequency range. From these carrier frequencies a normalized correction signal, a so-called kernel, is generated which has a "Dirac"-like shape, that is, a shape that comprises a single peak as far as possible. To correct a transmit signal, this correction signal is phase shifted to the position of the maximum of the transmit signal and then scaled with a suitable scaling factor depending on the maximum amplitude of the transmit signal. Then, this correction signal is subtracted from the transmit signal. This can be repeated several times to iteratively correct several maximum or peak values. For transmission systems with a great number of carrier frequencies and consequently a great number of signal values in each frame, like a VDSL transmission system, this method is difficult to realize since it needs a relatively long computation time. Furthermore, through the use of a kernel, the carrier frequencies used for the correction have to comprise both low and high frequencies which, consequently, are not usable for data transmission. The use of low carrier frequencies, on the other hand, leads to a greater loss of transmission capacity since lower carrier frequencies can be modulated with more bits than high carrier frequencies due to the lower damping.

SUMMARY

One embodiment of the present invention provides a method and an apparatus that effectively reduce the crest factor using a limited number of carrier frequencies. Furthermore, one embodiment provides such a method and such an apparatus that are usable for VDSL transmission.

According to one embodiment of the invention, for reducing the crest factor of a signal using a plurality of partial correction signals having predetermined frequencies, the following steps are carried out:

(a) determining a time position of a maximum absolute amplitude of the signal, (b) calculating an amplitude and a phase for the respective partial correction signal depending on said maximum absolute amplitude and said time position determined in step (a), (c) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, said method further comprising the step of (d) outputting the last obtained partially corrected signal as the corrected signal having the reduced crest factor.

As for each of the predetermined frequencies, i.e. carrier frequencies, an amplitude and a phase is calculated, and it is possible to use the predetermined frequencies available in an optimum manner to correct the signal.

Steps (a) to (c) may be repeated a given number of iterations to obtain even better results.

In step (b), the amplitude may be calculated according to $$A = g \cdot (\max \{X(t) \cdot \cos(2\pi f(t - t \max))\} + \min \{X(t) \cdot \cos(2\pi f(t - t \max))\})$$

A being the amplitude, g being a predetermined factor, f being the respective predetermined frequency, t being the time, t max being said time position, X(t) being said signal and max and min designate the maximum and minimum operator, respectively. The phase accordingly amounts to $2\pi f \cdot t \max$.

For discrete multitone modulation signals as mentioned in the introductory portion, the signal may be represented as a signal vector of signal values at N sampling times. Accordingly, the above formula may be reformulated basically by replacing the time by the number of the sample and replacing the frequency by a number of the frequency divided by N.

The method as described so far is suitable for signals where the signal vector does not comprise too many samples. For transmission systems like VDSL systems carrying out the described method in full would cost considerable calculation time.

Therefore, instead of performing the above method on the signal or on a vector representing the signal, one embodiment performs the method on a vector containing only a predetermined number of maximum amplitude values of the signal. This predetermined number may be significantly lower than the number of samples in the actual signal vector, therefore saving considerable calculation time while only marginally lowering the performance. To do this, the positions of the elements of the vector with the maximum amplitude values in the original signal vector have to be stored since the final correction has to be performed on the signal itself.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

As already described in the introductory portion with reference to FIG. 1, a transmit signal in a multitone transmission like discrete multitone transmission comprises a number of samples derived from parallel processing of a number of bits of serial data, a data block. This transmit signal may be described as a vector $$X^T = [x(1), x(2), \ldots, x(N)], \quad (1)$$

N being the number of samples and x(n) being the respective samples, n ranging from 1 to N. The index n thus denotes the time position of the respective sample. "T" indicates that the vector in equation (1) is written in a line instead of in a column.

One embodiment of the present invention is to determine a correction vector Xk so that the maximum absolute value or amplitude of the elements of the vector Xs with $$Xs = X - Xk \quad (2)$$

assumes a minimum value. The correction vector Xk is a superposition of several partial correction vectors corresponding to a number of carrier frequencies or carrier tones reserved for forming the correction vector Xs, i.e.

$$Xk = \sum_{i=1}^{Nt} Xk_i, \quad (3)$$

Nt being the number of carrier frequencies reserved for correction. $Xk_i$ denotes the i-th correction vector contribution of carrier frequency number i.

In general, the components of $Xk_i$ may be written as $$xk_i(k) = a_i(\mu)\cos\left(2\pi\mu \cdot \frac{k-1}{N}\right) + b_i(\mu)\sin\left(2\pi\mu \frac{k-1}{N}\right), \quad (4)$$

wherein k is the component or sample index of the vector, ranging from 1 to N, and μ is the number of the respective carrier frequency used to form the correction vector $xk_i$ assuming that all the carrier frequencies used including those used for transmitting the actual information are numbered consecutively and are spaced evenly apart from each other, starting with 0. Such a numbering of carrier frequencies is usually used for example for the carrier frequencies of ADSL or VDSL transmission. Generally, equation (4) is an oscillation with the frequency determined by μ and an amplitude and phase determined by $a_i$ and $b_i$.

In the following, an iterative procedure for correcting the vector X and for determining the correction vector Xk is given, comprising the following steps:

1. determining the element of the vector X having the maximum absolute amplitude |X(k max)| and its position within the vector X k max, and 2. forming an auxiliary vector Xh according to $$xh(k) = x(k)\cos\left(2\pi\mu\frac{k - k\max}{N}\right); k = 1, 2, \ldots N, \quad (5)$$

xh being the components of Xh. Since the cosine term for k=k max is equal to 1, the auxiliary vector has the element with the same maximum absolute amplitude at the same position k max as the vector X.

3. For the carrier frequency μ, a partial correction is carried out according to:

$$x(k)_{new} = x(k)_{old} - g(\max\{xh(k)\} + \min\{xh(k)\}) \cdot \quad (6)$$
$$0.5 \cdot \cos\left(2\pi\mu\frac{k - k\max}{N}\right)$$
$$k = 1, 2, \ldots, N,$$

wherein the indices "new" and "old" indicate that the elements of the vector X are replaced by the new elements. In equation (6), max is the maximum operator yielding the maximum value of all the xh(k) and mm is the corresponding minimum operator. In general, the minimum will be a negative value. It should be noted in this respect that the maximum absolute amplitude determined in step 1 may be either the maximum or the minimum value. The factor g is an appropriate converging factor which may be chosen to be 1 or may vary from iteration to iteration as explained below. The factors 0.5 and g may be drawn into a single factor.

4. also given is repeating steps 1 to 3 for all carrier frequencies μ used for correcting the signal, whereby the "new" vector X is used for the respective next carrier frequency.

5. also given is repeating steps 1 to 4 L times. The converging factor g can be chosen to decrease from iteration to iteration ensuring a better convergence.

The total correction vector Xk would then be a sum of all the corrections carried out in step 3.

The vector $X^T=[x(1),x(2),\ldots,x(N)]$ resulting from this method has the smallest maximum absolute amplitude possible with a correction signal consisting of the given correction carrier frequencies.

On the other hand, for vectors X having a large number of elements this algorithm needs a large realization effort since for each iteration for each carrier frequency used for correction a correction term has to be subtracted componentwise from the original vector X. For example, for a VDSL transmission vector the vector X has 8192 elements.

Therefore, a simplification of the above algorithm is needed for vectors X having a large number of elements. The general idea for simplifying the above algorithm is not to perform the algorithm on the complete vector X, but on an auxiliary vector $Xm^T=[xm(1),xm(2),\ldots,xm(M)]$ comprising the M elements having the largest absolute amplitudes of the vector X, M being much smaller than N. For example, for VDSL systems M may be chosen to be 32 which is considerably smaller than 8192, thus saving considerably computation time. Since the correction itself has to be performed on the whole signal, that is on the vector X, a further auxiliary vector $Pm^T=[pm(1), pm(2), \ldots, pm(M)]$ is needed for storing the positions of the elements of the vector Xm within the vector X, i.e. xm(k)=x(pm(k)).

An algorithm for determining the vectors Xm and Pm will be given later.

In the following, it will be shown how the algorithm described above has to be performed using the vector Xm. The following steps have to be carried out corresponding to the respective steps of the algorithm already explained:

1. the position k max of the element of the vector Xm having the largest absolute amplitude or value |xm(k max)| is determined and 2. an auxiliary vector Xmh according to $$xmh(k) = xm(k) \cdot \cos\left(2\pi\mu\frac{pm(k) - pm(k\max)}{N}\right); \quad (7)$$
$$k = 1, 2, \ldots, M$$

is calculated, wherein the xmh are the components of the vector Xmh. Thus, through the use of the vector Pm within the cosine term, the cosine term assumes the "correct" values for the elements of the vector Xm that correspond to the values of the correction finally performed on the whole signal X.

3. A partial correction corresponding to the one for the full vector X is carried out:

$$xm(k)_{new} = xm(k)_{old} - g \cdot (\max\{xmh(k)\} + \min\{xmh(k)\}) \cdot \quad (8)$$
$$0.5 \cdot \cos\left(2\pi\mu\frac{pm(k) - pm(k\max)}{N}\right);$$
$$k = 1, 2, \ldots, M.$$

After performing the algorithm the correction vector Xk for the signal vector, X has to be calculated. To this end, it is helpful to store for each partial correction and for each frequency μ the correction amplitude $$\Delta u(i,j)=g\cdot(\max\{xmh(k)\}+\min\{xmh(k)\})\cdot 0.5, \quad (9)$$

and the corresponding phase $$\Delta p(i,j)=pm(k_{max}), \quad (10)$$

wherein i is again the number of the carrier frequency as in equation (4) and j is the number of the iteration.

4. steps 1 to 3 for all carrier frequencies μ used for the correction signal or vector, and 5. steps 1 to 4 L times, possibly with decreasing converging parameter g.

At the end of this procedure, an auxiliary vector Xm having a minimal maximum absolute amplitude is obtained. From the stored amplitude and phase values Δu(i,j) and Δp(i,j), the amplitudes and phases for the final correction vector Xk with N components can be calculated. Each partial correction vector for a single correction carrier frequency μ can be calculated according to equation (4). The respective correction amplitudes $a_i(\mu)$ and $b_i(\mu)$ can be calculated as follows:

$$a_i(\mu) = \sum_j \Delta u(i, j)\cos\left(2\pi\Delta p(i, j)\cdot\frac{\mu}{N}\right) \quad (11)$$
$$b_i(\mu) = \sum_j \Delta u(i, j)\sin\left(2\pi\Delta p(i, j)\frac{\mu}{N}\right).$$

Alternatively, the amplitudes $a_i(\mu)$ and $b_i(\mu)$ may be computed iteratively in step 3 of the algorithm given above, so that the $\Delta u$ and $\Delta p$ do not have to be stored. In this case, in step 3, the following calculations have to be performed:

$$a_i(\mu)_{new} = a_i(\mu)_{old} + \Delta u(i,j) \cdot \cos\left(2\pi\mu \frac{\Delta p(i,j)}{N}\right) \quad (12)$$

$$b_i(\mu)_{new} = b_i(\mu)_{old} + \Delta u(i,j) \cdot \sin\left(2\pi\mu \frac{\Delta p(i,j)}{N}\right).$$

The correction vector is composed of cosine and sine values weighed with respective amplitude values. The cosine and sine values can be read from a sine table or a cosine table. One table is sufficient for the cosine and the sine values since its two functions only differ in the phase, that is the respective address of the table read out has to be adapted. The use of such a sine table makes the algorithm faster compared to explicitly calculating the sine or cosine values each time.

A reduction of the values to be stored in such a table can be obtained if the sine or cosine value is calculated as an interpolation, for example a linear interpolation, between stored sine values. It has turned out that the storage of 32 sine values of a quarter period is sufficient. The remaining three quarters of the period of the sine and cosine functions can be calculated using the symmetry of these functions.

It is possible to write the partial correction vector $Xk_i$ also as $$xk_i(k) = c_i(\mu)\cos\left(2\pi\mu \frac{k-1}{N} + \varphi_i(\mu)\right) \text{ with} \quad (13)$$

$$c_i(\mu) = \sqrt{a_i^2(\mu) + b_i^2(\mu)} \; ; \;\; \varphi_i(\mu) = \arctan\left(\frac{b_i(\mu)}{a_i(\mu)}\right). \quad (14)$$

arctan being the arcus tangens operator.

In this case, only a single sine value has to be calculated or read out from the sine table for each partial correction vector with the carrier frequency $\mu$. The values for $c_i(\mu)$ and $\phi_i(\mu)$ from equation (14) may also be calculated using the known Cordic algorithm. This algorithm is used for calculating amplitude of a phase of a complex number when its real end imaginary part is given. As a real part $a_i$ and as imaginary part $b_i$ can be taken. The Cordic algorithm is an iterative algorithm that uses only additions and subtractions as well as the sign function for determining the sine of a number. For performing the algorithm, L arcus tangens values have to be stored, L being the number of iterations of the Cordic algorithm. After carrying out the Cordic algorithm the amplitude of the respective complex number which results from the algorithm is enlarged by a fixed factor dependent on L. Therefore, it is necessary to divide this value by this factor. To be able to omit these divisions, the values of the sine table may be divided by the factor in advance.

A further reduction of computing effort can be obtained if the stored values of the sine table, for example 32 values, are multiplied with the respective amplitude of the correction carrier frequency in advance and stored in an intermediate storage. For computing the partial correction vector this intermediate storage would simply have to be addressed. No further multiplication would be necessary.

The realization effort can be further reduced significantly by choosing the carrier frequencies used for correction in an appropriate manner. If, for the representation of equation (13), the carrier frequency is chosen as $$\mu = 2^l \cdot v \quad (15)$$

and the number of elements in the vector X is $$N = 2^n \quad (16)$$

which is generally the case for system using inverse fast Fourier transform like the system described in the introductory portion, equation (14) transforms to $$xk_i(k) = c_i(\mu)\cos\left(2\pi 2^l \cdot v \cdot \frac{k-1}{2^n} + \varphi_i(\mu)\right) \text{ or} \quad (17)$$

$$xk_i(k) = c_i(\mu)\cos\left(2\pi \cdot v \cdot \frac{k-1}{2^{n-l}} + \varphi_\mu\right). \quad (18)$$

As can be easily seen, the partial correction vector $Xk_i$ is periodic with a period of $2^{n-l}$. If the different carrier frequencies used for correction differ only in the value v, the resulting correction vector Xk only has to be calculated for the first $2^{n-l}$ values. The whole correction vector is then obtained through periodic continuation.

For the simplified algorithm, as stated above, the auxiliary vector Xm is needed containing the M values of the vector X having the largest absolute amplitude values. A possible algorithm for obtaining the vector Xm and the vector Pm comprises the following steps:

1. The vector Xm is initialized to contain the M last elements of the vector X, that is, $$xm(k) = x(N-M+k); \; k=1,2,\ldots,M. \quad (19)$$

2. The vector Pm is initialized accordingly, that is, $$pm(k) = N-M+k; \; k=1,2,\ldots,M. \quad (20)$$

3. A counter $\lambda$ is set to 0: $\lambda=0$.

4. The element of the vector Xm having the smallest absolute value is determined:

$$x\min = \min\{|xm(k)|\} \quad (21)$$

x min being that minimum value.

5. The corresponding position k min is determined:

k min=Position of min $\{|xm(k)|\}$; that is, $$|xm(k\min)| = \min\{|xm(k)|\}. \quad (22)$$

6. The counter $\lambda$ is incremented: $\lambda = \lambda + 1$.

7. The element of the vector X designated by the counter $\lambda$ is compared with x min; steps 6 and 7 are repeated until $$|x(\lambda)| > x\min.$$

8. When $|x(\lambda)| > x$ min is fulfilled, the minimal element of the vector Xm is replaced by the element of the vector X designated by the counter $\lambda$, and the corresponding element of the vector Pm is replaced by $\lambda$, that is, $$xm(k\min) = x(\lambda)$$

$$pm(k\min) = \lambda.$$

9. The procedure is continued at step 6 until $\lambda$ has reached the value N–M When this procedure is completed, the vector Xm contains the M values having the largest absolute amplitudes of the vector X, and the vector Pm contains the corresponding positions.

The time needed for performing this algorithm depends on the arbitrary values of the starting vector for Xm. The more large values this vector contains when starting the procedure, the less often the contents of the vector Xm has to be overwritten and the minimum element of the vector Xm be determined. Consequently, through a pre-sorting of the vector X it is possible to optimize this algorithm.

Figure 3:
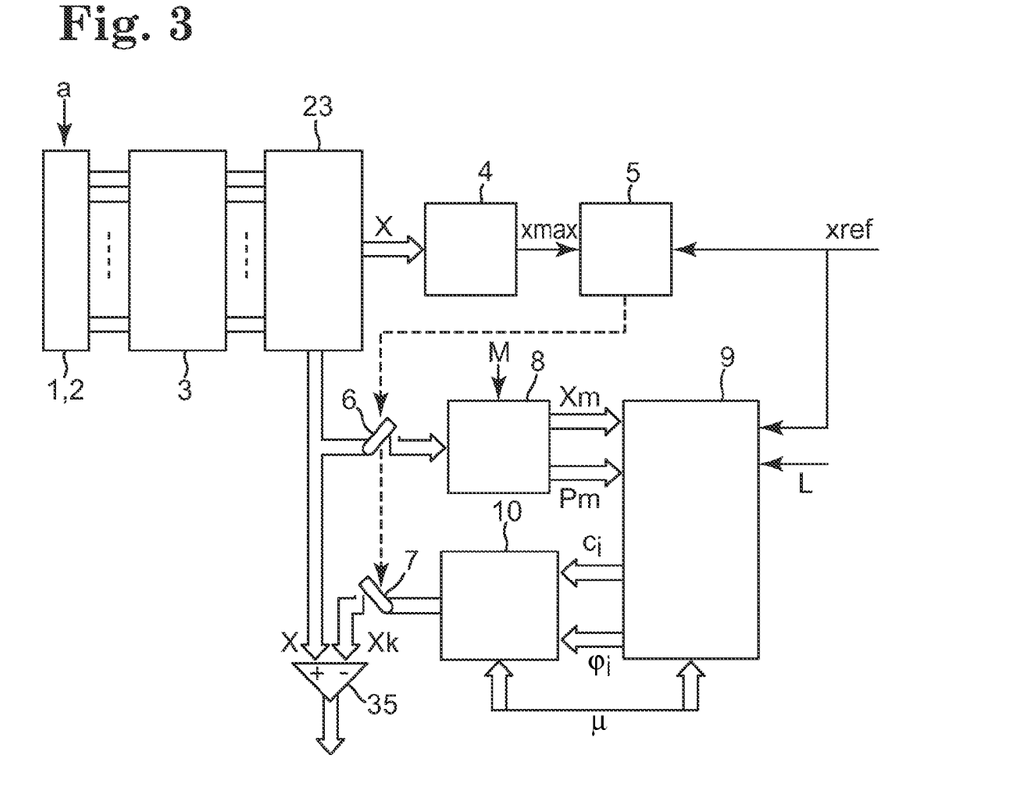
FIG. 3 illustrates an embodiment of an apparatus for reducing a crest factor of a signal according to the present invention.

FIG. 3 illustrates an apparatus suitable for carrying out the method of the present invention corresponding to the algorithms described above. A data signal a is supplied to a serial-to-parallel converter 1 and modulated onto a number of carrier frequencies wherein a predetermined number of carrier frequencies are not used for transmitting the data, but for building the correction signal as described above. On the thus generated signal, an inverse Fourier transform is performed in element 3, and the data is supplied to a parallel-to-serial converter 23, which is generally used for serially outputting the corresponding signal vector. Up to this point, the apparatus corresponds to the one already described with reference to FIG. 1 above, that is, in converter 23 the vector X is stored. The vector X is transmitted to means 4 for determining the maximum amplitude x max of the elements of the vector X. Comparing means 5 compare this maximum value x max with a given reference value x ref. If x max is below x ref, switches 6 and 7 are opened, meaning that no correction algorithm is performed as the maximum value x max is below x ref which represents a maximum tolerable value for the amplitudes or values of the vector X. In this case, the vector X is output via a subtractor 35 unchanged, since switch 7 supplying the negative input of subtractor 35 is opened.

If however, x max exceeds xref, the switches 6 and 7 are closed. Via switch 6, the vector X is supplied to sorter 8 which, with the help of the parameter M already described above, determines the auxiliary vectors Xm and Pm which are supplied to calculator 9. Calculator 9 performs the above-described iterative algorithm on the vector Xm and then computes the amplitude and phase values $c_i$ and $\phi_i$ using the frequencies μ allocated for correction. At most L iterations are performed. If, however, x max falls below xref cefore the L interations are performed, the algorithm is terminated and the values for $c_i$ and $\phi_i$ are output. In vector builder 10, the total correction vector Xk is built as described above and supplied via switch 7 to the subtractor 35 where it is subtracted from the vector X.

It should be noted in this respect that the vector representation serves as a means for easily representing the signals. However, the whole procedure may as well be viewed as carried out using the signals themselves, that is, emitting corresponding correction signals having the respective frequencies μ.

It is possible to use less frequencies μ for correcting the signals than actually allocated. For example, twelve frequencies may be allocated for correction, two of three of them may be used. These two or three frequencies should be changed from vector X to vector X, i.e. from frame to frame, to distribute the power of the correction signal over all correction frequencies.

Therefore, it is necessary to modify the algorithm slightly. If after the L-th iteration x max is still greater than xref, the procedure is repeated with a different choice of correction frequencies. If this is not the case after a certain number of tries, the frequencies which yielded the smallest value x max are used.

In the following, the performance of the method according to the invention will be demonstrated using simulation results.

EXAMPLE 1

Downstream Transmission in an ADSL System

For the inverse fast Fourier transform in ADSL systems generally 265 frequency values which are equally spaced from 0 to half the sampling frequency are defined. Therefore, a frame or vector X comprises 512 signal values, that is, N=512. The distance between carrier frequencies is 4.3125 KHz, resulting in a sampling frequency of 2.208 MHz. For data transmission the frequencies numbers 33 to 255 are used (142.3 to 1100 KHz). Two different sets of parameters were simulated. The first simulation was performed using frequency numbers 254, 217, 247, 225, 239, 231, 210 and 243 for correction purposes. M was set to 8, L, the maximum number of iterations, also to 8. xref was set to 4.1. The power of the signal was normalized to 1, so that the peak value corresponds to the crest factor.

Figure 4A:
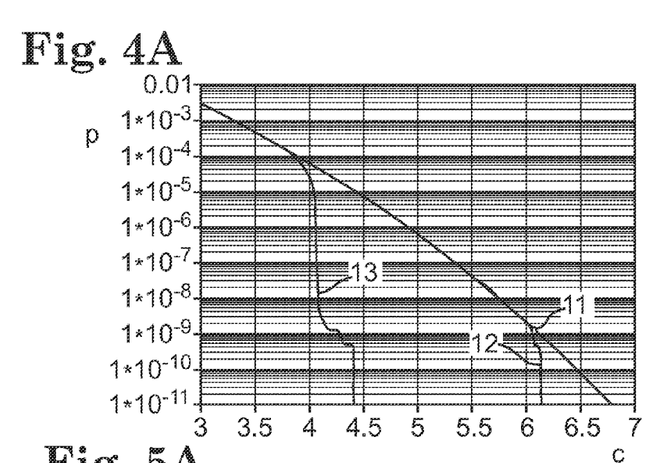
FIGS. 4A and 4B illustrates simulations of the performance of the method of the present invention for ADSL signals.
Figure 4B:
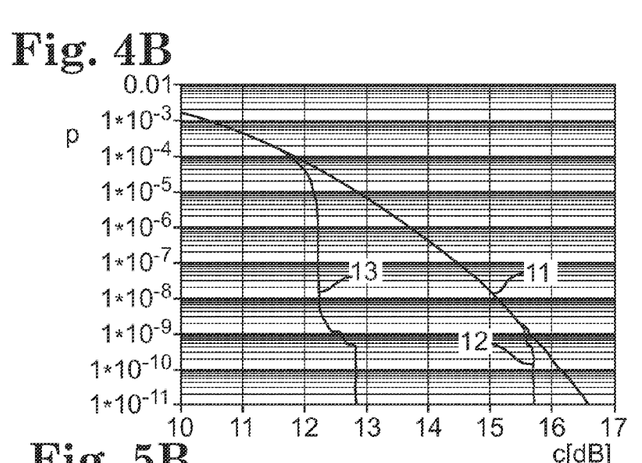

FIGS. 4A and 4B illustrates the results for these values. FIG. 4A illustrates the probability p for the occurrence of various crest factors C given as a ratio, FIG. 4B illustrates the same graph with the crest factor c given in decibel. Curve 11 shows the theoretical Gaussian distribution. Curve 12 shows the result without correction. The reason why curve 12 deviates from curve 11 is the limited simulation time, for a longer simulation time also the even higher crest factors would eventually occur. It can be seen that crest factors above 5.5 occur with a probability greater than $10^{-8}$.

Curve 13 shows the results using the method according to the present invention. It can be seen that the probability for a crest factor of 4.1 or 12.25 dB is $10^{-8}$ corresponding to a reduction of 2.9 dB compared to the non-corrected case of curve 12.

Figure 5A:
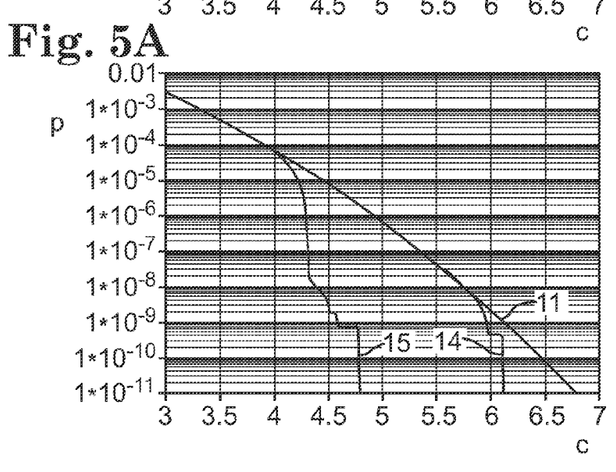
FIGS. 5A and 5B illustrate further simulations of the performance of the method of the present invention for ADSL signals.
Figure 5B:
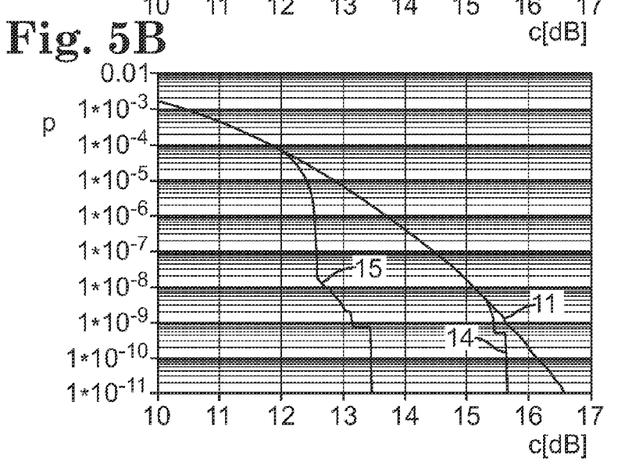

For a second simulation, only five carrier frequencies were used for correction, namely numbers 240, 224, 208, 192 and 176. These five carrier frequencies are evenly spaced apart resulting in a periodic correction signal or correction vector Xk with a period of 32. M and L were both set to 8 as in the first simulation, and xref was set to 4.3. The result as illustrated in FIGS. 5A and 5B corresponding to FIGS. 4A and 4B of the first simulation. Curve 11 again is the theoretical Gaussian distribution, curve 14 is the uncorrected curve corresponding to curve 12 of FIGS. 4A and 4B, and curve 15 is the corrected curve using the method of the present invention. The deviations between curves 12 in FIGS. 4A and 4B and curves 14 in FIGS. 5A and 5B again stem from the statistical nature of the amplitude distribution and the limited simulation time. In this case, a crest factor of 4.4 corresponding to 12.85 dB occurs with a probability of $10^{-8}$. Here, still a reduction of 2.3 dB compared to the uncorrected curve is obtained.

Consequentialy, it can be seen that the method of the present invention leads to a considerable reduction of the crest factor for ADSL transmissions.

EXAMPLE 2

VDSL Transmission

In VDSL systems 4096 frequency values are equally spaced apart from 0 to half the sampling frequency, resulting in a frame or vector X having 8192 values or elements. The distance between carrier frequencies is 4.3125 KHz corresponding to the ADSL value, resulting in a sampling frequency of 35.328 MHz.

Figure 6A:
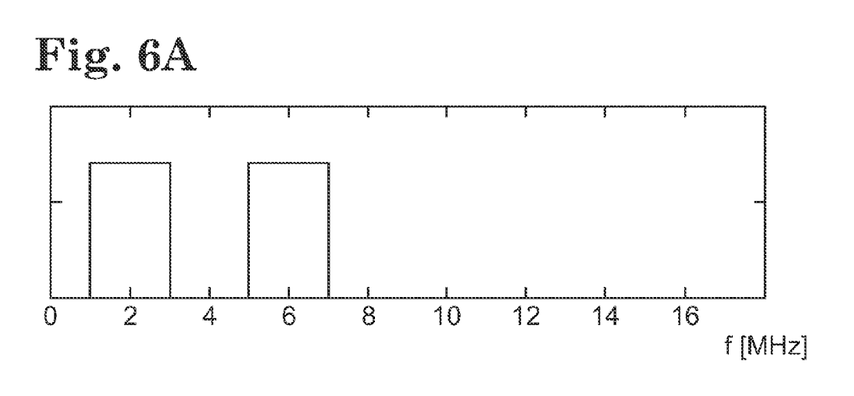
FIGS. 6A and 6B illustrate usable frequency ranges for VDSL in a downstream and in an upstream direction, respectively.
Figure 6B:
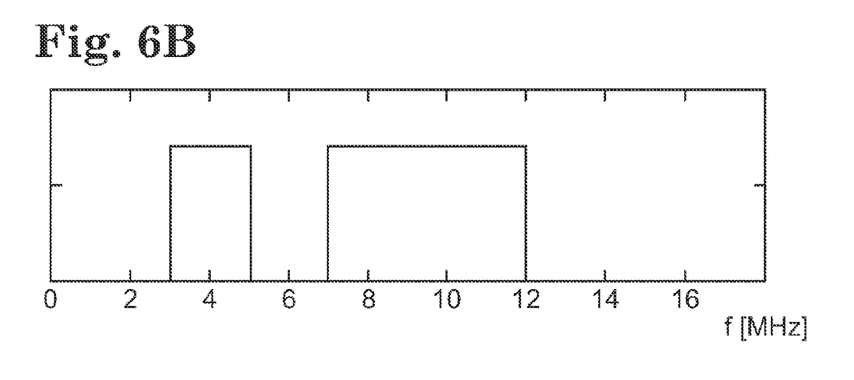

For downstream and upstream transmission different frequency ranges are defined, which are illustrated in FIGS. 6A and 6B. FIG. 6A illustrates the frequencies reserved for downstream transmission corresponding to frequencies number 257 to 695 and 1182 to 1634. FIG. 6B illustrates the frequencies reserved for upstream transmission, that is, is frequency numbers 696 to 1181 and 1635 to 2782.

First, a simulation for upstream transmission was performed.

Twelve possible carrier frequencies were allocated for correction purposes, frequencies number 2688, 2624, 2560, 2496, 2432, 2368, 2304, 2240, 2176, 2112, 2048, 1984. Three of these frequencies were used for actual correction. The allocated carrier frequencies are equally spaced apart and have a distance of 64 (i.e. 64×4.3125 KHz), resulting in a correction signal having a period of 128 independent of the actual choice of the three carrier frequencies used for correction. As parameters for the method of the present invention M=32, xref=4.3 and L=8 were used. A maximum number of twelve choices of the three carrier frequencies were tried for each correction.

Figure 7A:
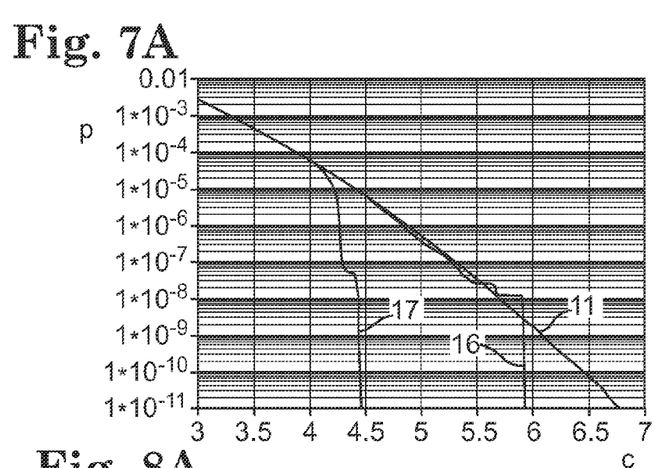
FIGS. 7A and 7B illustrate simulation results for VDSL upstream.
Figure 7B:
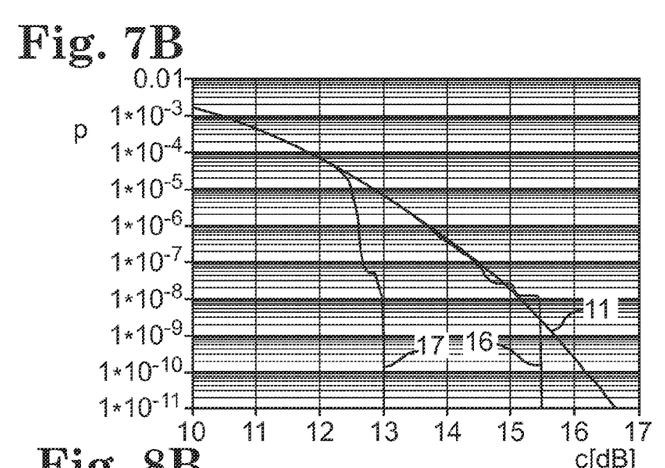

FIGS. 7A and 7B illustrates the simulation results, the representation of the results again being similar to those of FIGS. 4 and 5. Curve 11 again represents the theoretical Gaussian distribution, curve 16 the signal without correction and curve 17 the signal with correction according to the method of the present invention. A probability of $10^{-8}$ corresponds to a crest factor of 4.5 or 13 dB according to curve 17, which again is a considerable reduction compared to the 5.6 or 15 dB of the uncorrected curve 16.

Figure 8A:
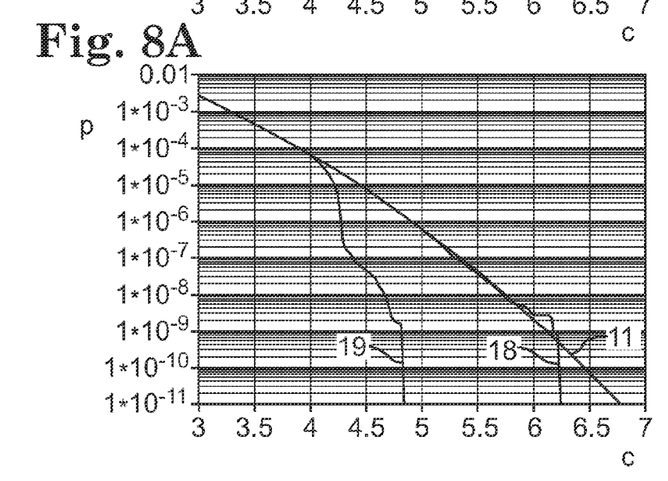
FIGS. 8A and 8B show simulation results for VDSL downstream.
Figure 8B:
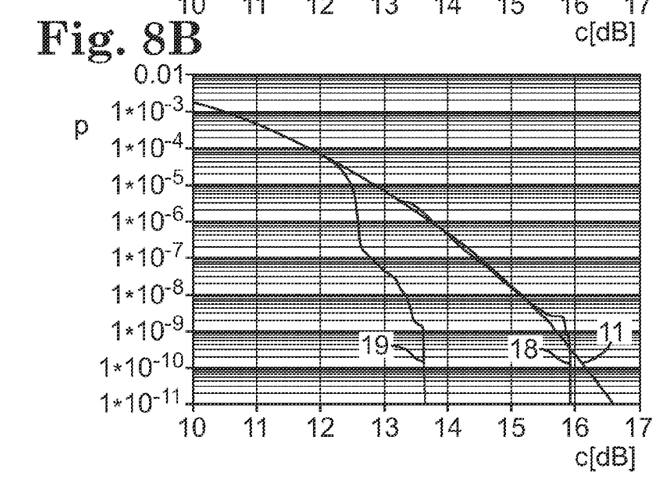

For a downstream simulation, six carrier frequencies were used, namely frequencies number 1600, 1536, 1472, 1408, 1344 and 1280. The distance between the carrier frequencies again is 64, which again results in a periodic correction signal having a period of 128. For the simulation, the parameters M=32, xref=4.3 and L=8 were used. FIGS. 8A and 8B illustrate the results of this simulation. Curve 18 is the result without correction, curve 19 is the result with the correction according to the present invention. A probability of $10^{-8}$ corresponds to a crest factor of 4.65 or 13.4 dB, again yielding a significant improvement compared to the uncorrected signal.

It should be noted that the simulation examples given above are only given as an illustration, and other parameters may be used depending on the amount of crest factor reduction needed and the amount of computation time possible. For example, a larger value of M generally leads to a better reduction of the crest factor, but needs more calculation time. Other carrier frequencies than the one used in the simulations may be allocated for correction purposes.

Although exemplary embodiments of the invention are described above in detail, this does not limit the scope of the invention, which can be practiced in a variety of embodiments.

I claim:

1. A method for reducing the crest factor of a signal, said method using a plurality of partial correction signals having respective predetermined frequencies, said method comprising:

(a) determining a time position of a maximum absolute amplitude of the signal, (b) calculating an amplitude and a phase for the respective partial correction signal depending on said maximum absolute amplitude and said time position determined in step (a), (c) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, and (d) outputting the last obtained partially corrected signal as the corrected signal having the reduced crest factor.

2. The method according to claim 1, wherein steps (a) to (c) are repeated for at least two iterations for each one of the plurality of partial correction signals.

3. The method according to claim 2, where a maximum number of iterations is predetermined.

4. The method according to claim 2, wherein steps (a) to (c) are repeated for each one of the plurality of partial correction signals until a maximum absolute amplitude of the partially corrected signal is below a predetermined value.

5. The method according to claim 1, wherein step (b) comprises the steps of (b1) calculating said amplitude according to $A=g \cdot (\max \{x(t) \cdot \cos(2\pi f(t-t \max))\} + \min \{x(t) \cdot \cos(2\pi f(t-t \max))\})$, A being the amplitude, g being a predetermined factor, f being the respective predetermined frequency, t being the time, t max being said time position and x(t) being said signal, and (b2) calculating said phase p according to $p=2\pi f \cdot t$ max.

6. The method according to claim 1, wherein the signal is a sampled signal represented as a signal vector of N signal values at N sampling times.

7. The method according to claim 6, wherein step (b) comprises the steps of (b1) calculating said amplitude according to the formula $$A=g \cdot (\max \{x(k) \cdot \cos(2\pi\mu(k-k \max)/N)\} + \min(x(k) \cdot \cos(2\pi\mu(k-k \max)/N)\}),$$

A being the amplitude, g being a predetermined factor, μ being a number of the respective predetermined frequency, k being a number of the sample, k max being this number of the sample at said time position, and x(k) being a k-th component of said signal vector, and (b2) calculating said phase p according to $p=2\pi\mu \cdot k$ max/N.

8. The method according to claim 7, wherein values for μ have the form $2^l \cdot v$, l and v being integer numbers.

9. The method according to claim 7, wherein cosine values of the formula are calculated using a sine or cosine table.

10. The method according to claim 1, wherein the signal is a multi-carrier signal.

11. The method according to claim 10, wherein the signal is a discrete tone modulated signal.

12. A method for reducing the crest factor of a signal, said method using a plurality of partial correction signals having respective predetermined frequencies, said method comprising:

(a) determining a time position of a maximum absolute amplitude of the signal, (b) calculating an amplitude and a phase for the respective partial correction signal depending on said maximum absolute amplitude and said time position determined in step (a), (c) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, and (d1) calculating a full correction signal as a superposition of said plurality of partial correction signals, (d2) subtracting the full correction signal from said signal to obtain the corrected signal having the reduced crest factor, and (d3) outputting said corrected signal are performed.

13. A method for reducing the crest factor of a signal, said method using a plurality of partial correction signals having respective predetermined frequencies, said method comprising:
- (a) determining a time position of a maximum absolute amplitude of the signal,
- (b1) calculating an amplitude and a phase for the respective partial correction signal depending on said maximum absolute amplitude and said time position determined in step (a),
- (b2) storing the calculated amplitude and phase values,
- (c) subtracting the respective partial correction signal from said signal to obtain a partially corrected signal which is used as the signal in step (a) for the next one of the plurality of partial correction signals, and returning to step (a) for calculating an amplitude and phase for the next partial correction signal, wherein steps (a) to (c) are repeated for at least two iterations for each one of the plurality of partial correction signals, and
- (d1) calculating a plurality of further partial correction signals having the respective redetermined frequency, each one as a superposition of the partial correction signals having the respective predetermined frequency in the stored phases and amplitudes calculated in steps (d) for this frequency,
- (d2) subtracting the plurality of further partial correction signals from said signal to obtain the corrected signal, and
- (d3) outputting said corrected signal.

14. A method for reducing the crest factor of a signal, said method using a plurality of partial correction signals having respective predetermined frequencies, said method comprising:
- (a) determining a timed position of a maximum absolute amplitude of the signal,
- (b) comparing the maximum absolute amplitude determined in step (a) with a predetermined value,
- wherein if the maximum absolute amplitude is above the predetermined value the following steps are preformed;
- (c) calculating an amplitude and a phase for the respective partial correction signal depending on said maximum absolute amplitude and said time position determined in step (a),
- (d) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, and
- (e) outputting the last obtained partially corrected signal as the corrected signal having the reduced crest factor, and
- wherein if the maximum absolute amplitude is below the predetermined value, the following step is preformed;
- (f) outputting the signal.

15. A method for reducing the crest factor of a signal, wherein the signal is a sampled signal represented as a signal vector of N signal values at N sampling times, said method using a plurality of partial correction vectors having respective predetermined frequencies, said method comprising:
- (a1) forming a first auxiliary vector containing as elements M signal values having the M largest absolute values of the N signal values, M being smaller than N,
- (a2) forming a second auxiliary vector indicating the positions of the elements of the first auxiliary vector in the signal vector,
- (a3) determining a time position of a maximum absolute amplitude of the first auxiliary vector using phase information of the second auxiliary vector,
- (b) calculating an amplitude and a phase for a respective partial correction vector depending on said maximum absolute amplitude and said time position determined in step (a3),
- (c) subtracting the respective partial correction vector from the first auxiliary vector to obtain a partially connected vector which is used as the first auxiliary vector in step (a3) for the next one of the plurality of partial correction vector, and returning to step (a3) for calculating an amplitude and a phase for the next partial correction vector,
- (d1) calculating a correction vector for the signal vector based on said amplitudes and said phases calculated in step (b) translated to phases for the signal vector using the second auxiliary vector,
- (d2) subtracting said correction vector from said signal vector to obtain a corrected signal vector, and
- (d3) outputting a signal corresponding to said corrected signal vector as the corrected signal having the reduced crest factor.

16. The method according to claim 15, wherein step (b) comprises the steps of (b1) calculating said amplitude according to $$A = g \cdot (\max \{xm(k) \cdot \cos(2\pi\mu(pm(k)-pm(k\,\max))/N)\} + \min \{xm(k) \cdot \cos(2\pi\mu(pm(k)-pm(k\,\max))/N)\}),$$

A being the amplitude, g being a predetermined factor, $\mu$ being a number of the respective predetermined frequency, k being a number of the sample, k max being the number of the sample at said time position, $xm(k)$ being element k of said first auxiliary vector, $pm(k)$ being element k of said second auxiliary vector, and (b2) calculating said phase p according to $p = 2\pi\mu \cdot k\,\max/N$.

17. The method according to claim 15, wherein steps (a1) and (a2) comprise the steps of:
- (aa1) assigning the M last elements of the signal vector to elements of the first auxiliary vector,
- (aa2) assigning the M last sample positions of the signal vector to the elements of the second auxiliary vector,
- (aa3) setting a counter to 0,
- (aa4) determining the element of the first auxiliary vector having the smallest absolute amplitude,
- (aa5) incrementing the counter by 1,
- (aa6) checking if the element of the signal vector designated by the counter has a larger absolute amplitude than the element of the first auxiliary vector having the smallest absolute amplitude, and, if not, returning to step (aa5),
- (aa7) replacing the element of the first auxiliary vector having the smallest absolute amplitude by the element of the signal vector designated by the counter, and replacing the corresponding element of the second auxiliary vector by the counter,
- (aa8) returning to step (aa4) until the counter has reached N−M.

18. An apparatus for reducing the crest factor of a signal using a plurality of partial correction signals having respective predetermined frequencies, said apparatus comprising processing means designed to carry out, for each one of said partial correction signals, the steps of:

(a) determining a time position of a maximum absolute amplitude of the signal,
(b) calculating an amplitude and a phase for the respective partial correction signal depending on said maximum absolute amplitude and said time position determined in step (a),
(c) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, said apparatus further comprising output means for outputting the last obtained partially corrected signal as the corrected signal having the reduced crest factor.

19. The apparatus according to claim 18, wherein the processing means are designed to repeat steps (a) to (c) for at least two iterations for each one of the plurality of partial correction signals.

20. The apparatus according to claim 19, where a maximum number of iterations is predetermined.

21. The apparatus according to claim 19, said apparatus further comprising comparison means for comparing a maximum absolute amplitude of said partially corrected signal with a predetermined value, said comparison means being coupled with said processing means such that steps (a) to (c) are repeated for each one of the plurality of partial correction signals until said maximum absolute amplitude of the partially corrected signal is below said predetermined value.

22. The apparatus according to claim 19, further comprising storage means for storing the calculated amplitude and phase values in step (b), and wherein the outputting means are designed such that they perform the steps of
(d1) calculating a plurality of further partial correction signals having the predetermined frequencies each as a superposition of the partial correction signals having the respective predetermined frequency phases and amplitudes stored in the storage means for this frequency
(d2) subtracting the plurality of further partial correction signals from said signal to obtain the corrected signal, and
(d3) outputting said corrected signal.

23. The apparatus according to claim 18, wherein the processing means are designed such that they carry out in step (b) the steps of
(b1) calculating said amplitude according to $$A = g \cdot (\max \{x(t) \cdot \cos(2\pi f(t-t\ \max))\} + \min \{x(t) \cdot \cos(2\pi f(t-t\ \max))\}),$$

A being the amplitude, g being a predetermined factor, f being the respective predetermined frequency, t being the time, t max being said time position and x(t) being said signal, and
(b2) calculating said phase p according to p=2πf·t max.

24. The apparatus according to claim 18, wherein the signal is a sampled signal represented as a signal vector of N signal values at N sampling times.

25. The apparatus according to claim 24, wherein said apparatus comprising preprocessing means for preprocessing said signal vector according to the steps of
(a1) forming a first auxiliary vector containing as elements the M signal values having the M largest absolute values of the N signal values, M being smaller than N,
(a2) forming a second auxiliary vector indicating the positions of the elements of the first auxiliary vector in the signal vector, wherein the preprocessing means are coupled to the processing means so that the processing means perform the steps (a) to (c) on the first auxiliary vector instead of on the signal using phase information of the second auxiliary vector, and
wherein the outputting means are designed to carry out the steps of
(d1) calculating a correction vector for the signal vector based on said amplitudes and said phases calculated in step (b) translated to phases for the signal vector using the second auxiliary vector,
(d2) subtracting said correction vector from said signal vector to obtain a corrected signal vector, and
(d3) outputting a signal corresponding to said corrected signal vector as the corrected signal having the reduced crest factor.

26. The apparatus according to claim 25, wherein the processing means are designed to carry out, in step (b), the steps of (b1) calculating said amplitude according to $$A = g \cdot (\max \{xm(k) \cdot \cos(2\pi\mu(pm(k)-pm(k\ \max))/N)\} + \min \{xm(k) \cdot \cos(2\pi\mu(pm(k)-pm(k\ \max))/N)\}),$$

A being the amplitude, g being a predetermined factor, μ being a number of the respective predetermined frequency, k being a number of the sample, k max being the number of the sample at said time position, xm(k) being element k of said first auxiliary vector, pm(k) being element k of said second auxiliary vector, and (b2) calculating said phase p according to p=2πμ·k max/N.

27. The apparatus according to claim 25, wherein the preprocessing means are designed to carry out, in steps (a1) and (a2), the steps of:
(aa1) assigning the M last elements of the signal vector to elements of the first auxiliary vector,
(aa2) assigning the M last sample positions of the signal vector to the elements of the second auxiliary vector,
(aa3) setting a counter to 0,
(aa4) determining the element of the first auxiliary vector having the smallest absolute amplitude,
(aa5) incrementing the counter by 1,
(aa6) checking if the element of the signal vector designated by the counter has a larger absolute amplitude than the element of the first auxiliary vector having the smallest absolute amplitude, and, if not, returning to step (aa5),
(aa7) replacing the element of the first auxiliary vector having the smallest absolute amplitude by the element of the signal vector designated by the counter, and replacing the corresponding element of the second auxiliary vector by the counter,
(aa8) returning to step (aa4) until the counter has reached N−M.

28. The apparatus according to claim 24, wherein the processing means are designed to carry out, in step (b), the steps of (b1) calculating said amplitude according to the formula $$A = g \cdot (\max \{x(k) \cdot \cos(2\pi\mu(k-k\ \max)/N)\} + \min(x(k) \cdot \cos(2\pi\mu(k-k\ \max)/N)),$$

A being the amplitude, g being a predetermined factor, μ being a number of the respective predetermined frequency, k being a number of the sample, k max being this number of the sample at said time position, and x(k) being a k-th component of said signal vector, and (b2) calculating said phase p according to $p=2\pi\mu \cdot k_{max}/N$.

29. The apparatus according to claim 28, wherein values for $\mu$ have the form $2^l \cdot v$, l and v being integer numbers.

30. The apparatus according to claim 28, said apparatus further comprising a stored sine or cosine table for calculating cosine values of the formula.

31. The apparatus according to claim 18, wherein the signal is a multi-carrier signal.

32. The apparatus according to claim 31, wherein the signal is a discrete tone modulated signal.

33. An apparatus for reducing the crest factor of a signal using a plurality of partial correction signals having respective predetermined frequencies, said apparatus comprising:
   processing means designed to carry out, for each one of said partial correction signals, the steps of:
   (a) determining a time position of a maximum absolute amplitude of the signal,
   (b) calculating an amplitude and a phase for the respective partial correction signal depending on said maximum absolute amplitude and said time position determined in step (a),
   (c) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, and
   output means designed to carry out the steps of:
   (d1) calculating a full correction signal as a superposition of said plurality of partial correction signals,
   (d2) subtracting the full correction signal from said signal to obtain the corrected signal having the reduced crest factor, and
   (d3) outputting said corrected signal.

34. An apparatus for reducing the crest factor of a signal using a plurality of a partial correction signals having respective predetermined frequencies, said apparatus comprising:
   processing means designed to carry out, for each one of said partial correction signals, the step of:
   (a) determining a time position of a maximum absolute amplitude of the signal,
   comparison means for comparing the maximum absolute amplitude determined in step (a) with a predetermined value, said comparison means being coupled with the processing means, and
   output means coupled to the comparison means,
   wherein if the maximum absolute amplitude is above the predetermined value the processing means performs:
   (b) calculating an amplitude and a phase for the respective partial correction signal depending on said maximum absolute amplitude and said time position determined in step (a),
   (c) subtracting the respective partial correction signal from said signal to obtain a partially corrected signal which is used as the signal in step (a) for the next one of the plurality of partial correction signals, and returning to step (a) for calculating an amplitude and a phase for the next partial correction signal, and
   the output means outputs the last obtained partially corrected signal as the corrected signal having the reduced crest factor, and
   wherein if the maximum absolute amplitude is below the predetermined value, the output means outputs the signal.

* * * * *

UNITED STATES PATENT AND TRADEMARK OFFICE
CERTIFICATE OF CORRECTION

PATENT NO. : 7,376,689 B2
APPLICATION NO. : 10/799353
DATED : May 20, 2008
INVENTOR(S) : Heinrich Schenk It is certified that error appears in the above-identified patent and that said Letters Patent is hereby corrected as shown below:

Column 1, line 12, delete "XDSL" and insert in place thereof --x DSL--.

Column 1, line 61, delete the Paragraph Return following "factor.".

Column 1, line 65, delete the Paragraph Return following "6,038,261.".

Column 3, line 59, delete "illustrates" and insert in place thereof --illustrate--.

Column 5, line 26, delete "mm" and insert in place thereof --min--.

Column 6, line 46, delete "steps 1 to 3" and insert in place thereof --Finally steps 1 to 3 are repeated--.

Column 6, line 49, delete "steps 1" and insert in place thereof --Steps are repeated 1--.

Column 8, line 44, delete "$\{|^{xm}(k)|\}$" and insert in place thereof --$\{|xm(k)|\}$--.

Column 8, line 61, delete "N - M" and insert in place thereof --N - M.--.

Column 9, lines 23, 24, and 26, delete all occurrences of "x ref" and insert in place thereof --xref--.

Column 9, line 31, delete "If however," and insert in place thereof --If, however,--.

Column 9, line 32, delete "sorter" and insert in place thereof --sorting means--.

Column 9, lines 37 and 41, delete "$\phi_i$" and insert in place thereof --$\varphi_i$--.

CERTIFICATE OF CORRECTION (continued)
U.S. Pat. No. 7,376,689 B2

Column 9, lines 41-42, delete "vector builder 10" and insert in place thereof --building means 10--.

Column 11, line 4, delete "that is, is" and insert in place thereof --that is,--.

Column 13, line 20, delete "and phase" and insert in place thereof --and a phase--.

Column 13, line 25, delete "redetermined" and insert in place thereof --predetermined--.

Column 13, line 38, delete "timed" and insert in place thereof --time--.

Column 14, line 13, delete "connected" and insert in place thereof --corrected--.

Column 14, line 30, move one "+" to beginning of the second line of equation.

Signed and Sealed this

Twenty-third Day of February, 2010

David J. Kappos
*Director of the United States Patent and Trademark Office*